Sept. 29, 1970     A. F. KUBLI     3,531,071

CABLE SUPPORT

Filed Aug. 16, 1968     2 Sheets-Sheet 1

INVENTOR.
ARTHUR F. KUBLI

BY his ATTORNEY

INVENTOR.
ARTHUR F. KUBLI
BY
his ATTORNEY

United States Patent Office 3,531,071
Patented Sept. 29, 1970

3,531,071
CABLE SUPPORT
Arthur F. Kubli, 519 Coal St., Pitcairn, Pa. 15140
Continuation-in-part of application Ser. No. 566,133,
July 18, 1966. This application Aug. 16, 1968,
Ser. No. 756,086
Int. Cl. F16l 3/12, 3/22
U.S. Cl. 248—68                    2 Claims

ABSTRACT OF THE DISCLOSURE

A cable support comprising a pair of support blocks held separated by springs, or by nuts, so that confronting substantially, semi-circular, chamfered cut-out portions between the blocks will allow cables to be freely pulled through the support without damaging the insulation.

A modification comprises three or more support blocks having similar confronting cut-out portions so that cables may be spaced horizontally as well as vertically from each other, such as in a delta arrangement.

---

This application is a continuation-in-part of my application Ser. No. 566,133, filed July 18, 1966 for a Cable Support. This invention relates to a support for insulatingly and yieldably supporting a plurality of cables at a predetermined distance apart.

An outstanding disadvantage of conventionally used cable supports is that there is a great tendency for clamping the cable within the supports so tightly as to damage the cable or the insulation on the cable, particularly when the cable is pulled through the support.

An object of my invention is to provide a novel cable support which overcomes the abovenamed disadvantages.

A more specific object of my invention is to provide a yieldable cable support for maintaining cables, such as a three wire cable, at a predetermined spacing and which enables free pulling of the cables through the support without damage thereto.

Other objects and advantages will become more apparent from a study of the following description taken with the accompanying drawings wherein.

Figures 1, 2:
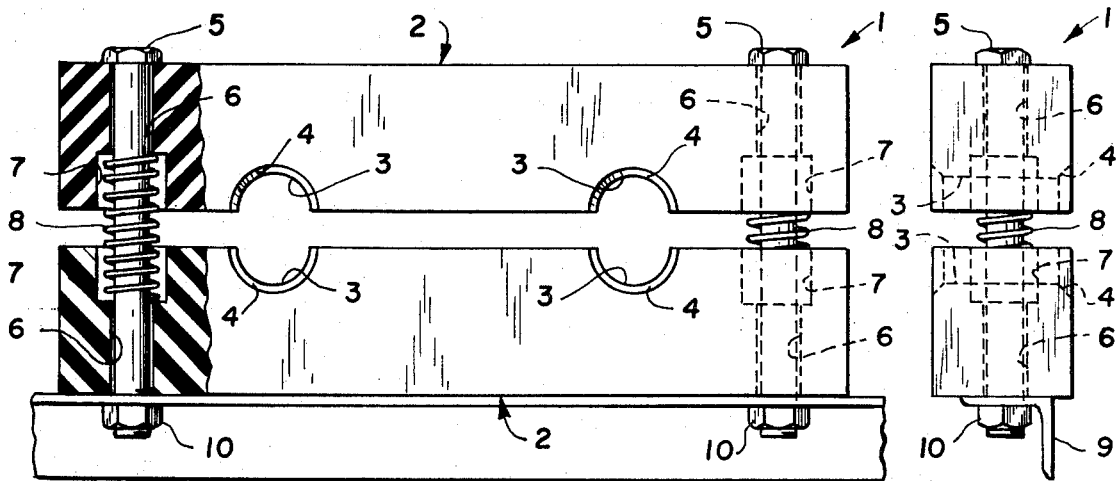
FIG. 1 is an elevational view, partly in cross-section, of a cable support for a two wire cable and embodying the present invention.
FIG. 2 is a side view of the support shown in in FIG. 1.
Figure 3:
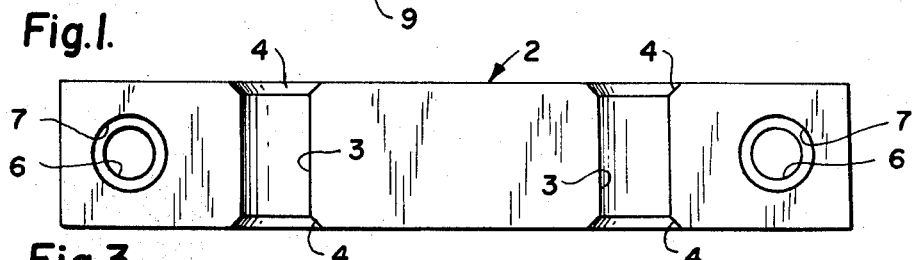
FIG. 3 is a top view of the lower half of said support of FIG. 1.

Referring more particularly to FIGS. 1, 2, 3 of the drawing, numeral 1 denotes generally, a cable support for either bare or insulated cables (not shown) having top and bottom halves 2 which have cut-out portions 3 of semi-circular outline with slight bevels 4 at the ends thereof. When the two halves are in confronting relationship as shown in FIG. 1, bolts 5 are extended through registering holes 6 by screwing nuts 10 on the threaded ends thereof, the two halves 2 are moved together in clamping relationship so as to clamp the cables which are extended through the confronting semi-circular holes 3.

Springs 8 are provided to normally urge the halves 2 apart so that when the halves are slightly separated, as shown in FIG. 1, the cables may be pulled freely through the slots 3 without damage to the cable or insulation or to the supporting structure of the clamp. The lower half 2 is supported on an angle iron 9 or other suitable support through the top flange of which holes are provided through which bolts 6 may be extended. The support halves are of fibre glass or other suitable insulating material.

Figure 4:
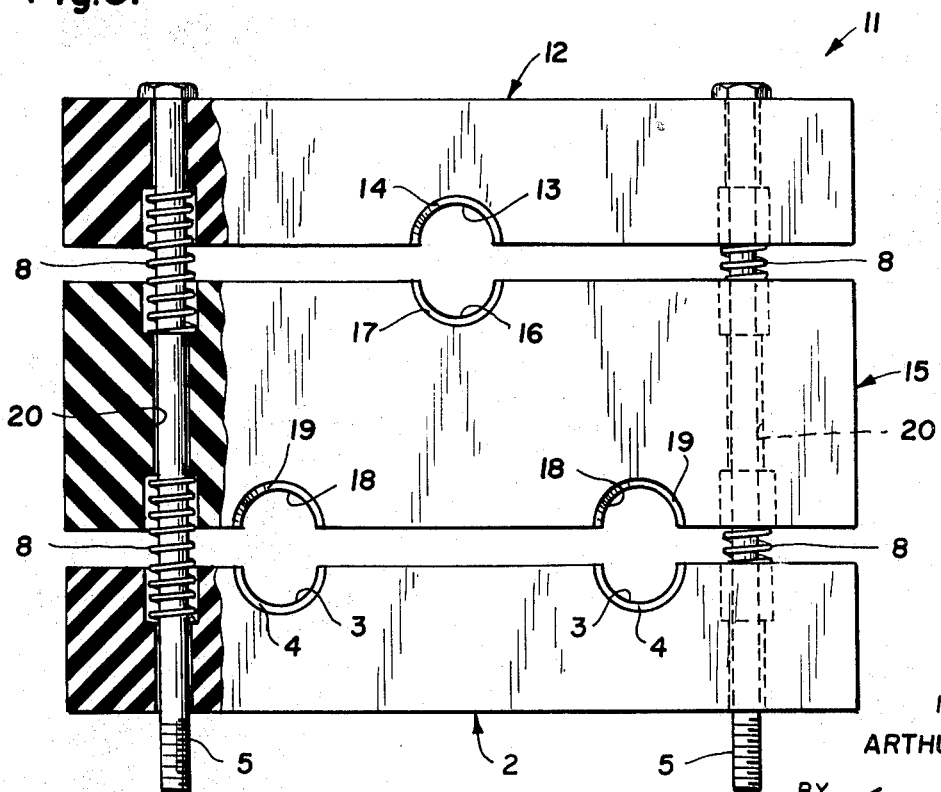
FIG. 4 is an elevational view of a modification of the support for a three cable installation.

FIG. 4 shows a modification of the cable support embodying three holes. The lowest support portion 2 is provided with semi-circular holes 3 and bevels 4. The intermediate holder portion 15 is provided with semi-circular holes 18 and 16 and bevels 19 and 17, respectively, and the top holder portion 12 is provided with slot 13 and bevel 14. Through registering holes 20 in the respective holder portion, bolts 5 are extended and are screwed into supports (not shown) such as 9 in FIG. 1 or perhaps a channel (not shown) into the opening of which the bolts extend and nuts are screwed thereon, which nuts are located in the channel.

Springs 8 yieldably hold and maintain the threee holder portions apart so that cables may be slid through the holes without appreciable friction such as to cause damage to the cable or insulation. It will be noted further that as the bolts 5 are screwed into a support, such as, angle iron 9, the springs 8 will yieldably hold the holder portions apart. And as the bolts 5 are screwed sufficiently as to bring the holder portions almost into engagement the springs will still keep them slightly apart. And if one cable tends to bind in its corresponding hole, the central support portion 15 will yield oppositely, since the central support portion is in floating relationship relative to the outer support portions.

Figure 5:
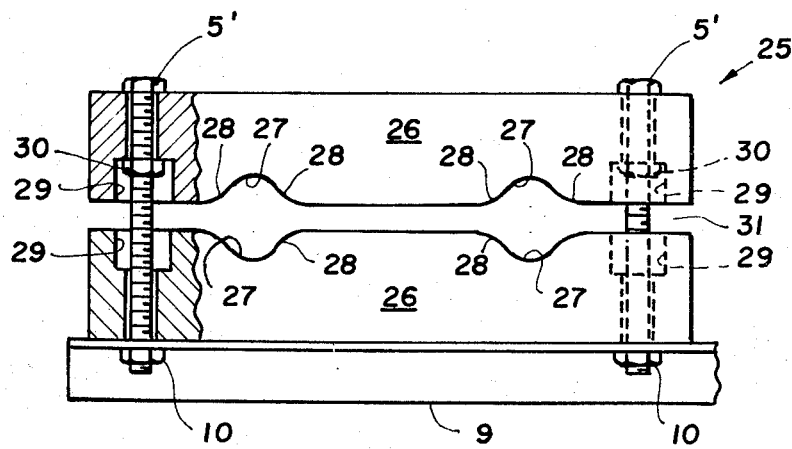
FIG. 5 is a modification of the cable support shown in FIG. 1.

FIG. 5 shows a modification of the cable support shown in FIG. 1 and which is denoted generally by numeral 25. It comprises upper and lower support blocks or halves 26 of either insulating material, such as plastic material, or metal, depending upon whether or not the supported cables are insulated. Confronting substantially semi-elliptical, cut-out portions 27 and 28 are provided to enable the use of cables of different diameter sizes. Portions 27 and 28 are chamfered at their front and rear edges. Through confronting holes extending through the upper and lower halves 26 there extend bolts which include a head portion 5' and nuts 30 and 10, the former for holding the upper half spaced from the lower half and the latter for anchoring the bolt to the base 9 to which it is screw threaded. Confronting well portions 29 are provided which may be correspondingly shaped with nut 30, or which may have at least one surface close to a flat surface of nut 30 to prevent turning thereof when the head 5' is turned. When it is desired to clamp the halves 26 together after the bolts have been pulled therethrough, the heads 5' are turned with a wrench so as to lower nuts 30, as well as top half 26 until tightly clamped to the lower half.

Figure 6:
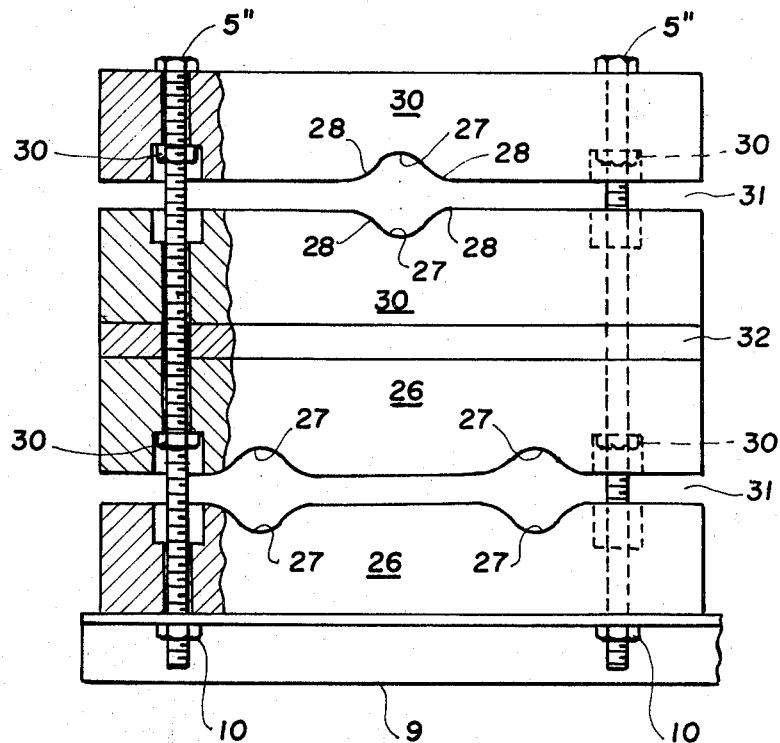
FIG. 6 is a modification of the cable support shown in FIG. 4.

FIG. 6 shows a modification of the support shown in FIG. 4 and comprises a top pair of confronting support blocks 30, preferably of insulation, each having semi-substantially elliptical portions 27 and 28, and a lower pair of confronting blocks 26 with similar cut-out portions but in spaced horizontal arrangement. The cut-out portions are chamfered similar to those in FIGS. 1, 3 and 4. A shim 32 is provided of any desirable width, depending on the desired spacing between the upper cable and lower cables. With such construction, identical halves 30 or 26 of the support may be used without the necessity of a specially constructed central block, as shown in FIG. 4. This eliminates the necessity of stocking large numbers of differently shaped blocks. The upper halves 30 and 26 are held apart from the lower halves either by springs as shown in FIG. 4 or by nuts 30. The halves are clamped by tightening of heads 5" so as to turn the threaded portions of the nuts into corresponding threaded portions in the support 9, shown of angle shape. Obviously, additional vertical layers of cables may be supported by stacking additional blocks with cut-out portions corresponding to the number of cables in any layer.

It should be noted that while the support 9 shown is at the bottom, the block may be supported upside down, sidewise or in any angular position, also that a plurality of like supports may be longitudinally arranged in the same manner to enable cables to be pulled therethrough, such as by a winch or other power-operated device. After the cables are pulled through the various, spaced supports, the bolts are tightened to clamp the cables between the block halves.

Thus it will be seen that I have provided an efficient cable support suitable for relatively high voltages of about 600 volts, more or less, which support has nut means or yieldable means for constantly urging the portions of the support apart so as to enable pulling of cables through the support without appreciable friction or danger of damage to the cable or the insulation on the cable; furthemore, I have provided a support for three or more cables, which support is relatively inexpensive, made of simple and easily and quickly assembled parts.

While I have illustrated and described several embodiments of my invention, it will be understood that these are by way of illustration only, and that various changes and modifications may be made within the contemplation of my invention and within the scope of the following claims.

I claim:

1. A cable support comprising a pair of upper and lower insulating support blocks, having a plurality of confronting, substantially semi-circular, smooth cut-out portions between which cables may be clamped, the outer ends of said portions being chamfered, registering holes extending through end portions of said blocks outside and at right angles to the axes of said cut-out portions, well portions in said holes of said upper insulating support block, bolt means extending axially through said holes, a nut in each of said well portions threaded to said bolt means for normally holding said support blocks apart sufficiently to enable longitudinal pulling of cables therethrough but insufficiently to enable the cables to become removed from said cut-out portions, each of said well portions including at least one flat surface which engages a flat surface of the nut to prevent turning thereof, and a support element into which one end of said bolts are screwed.

2. A cable support as recited in claim 1 together with a second pair of insulating support blocks stacked with relation to said first pair, said second pair having confronting, substantially semi-circular cut-out portions through which cables may be pulled and later clamped, and having registering holes through which said bolt means extend together with means for normally holding said second pair of support blocks apart.

References Cited

UNITED STATES PATENTS

| 530,166 | 12/1894 | Dost | 24—125 X |
|---|---|---|---|
| 770,278 | 9/1904 | Fletcher | 248—68 |
| 2,216,870 | 10/1940 | Adam | 174—157 X |
| 2,473,264 | 6/1949 | Stevens | 174—166 X |
| 3,023,989 | 3/1962 | White | 248—68 |
| 3,180,598 | 4/1965 | Girard | 248—68 |
| 2,732,226 | 1/1956 | Brattberg | 248—68 X |

FOREIGN PATENTS

| 544,618 | 4/1942 | Great Britain. |
|---|---|---|
| 954,405 | 4/1964 | Great Britain. |

CHANCELLOR E. HARRIS, Primary Examiner

U.S. Cl. X.R.

24—125